United States Patent
Broustis et al.

(10) Patent No.: US 9,652,277 B2
(45) Date of Patent: May 16, 2017

(54) SCALABLE NETWORK FUNCTION VIRTUALIZATION

(71) Applicant: AT&T Intellectual Property I, L.P., Atlanta, GA (US)

(72) Inventors: Ioannis Broustis, Springfield, NJ (US); Rittwik Jana, Montville, NJ (US); Sarat Puthenpura, Berkeley Heights, NJ (US); Nemmara K. Shankaranarayanan, Bridgewater, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 103 days.

(21) Appl. No.: 14/505,839

(22) Filed: Oct. 3, 2014

(65) Prior Publication Data

US 2016/0100330 A1     Apr. 7, 2016

(51) Int. Cl.
*G06F 9/455* (2006.01)
*H04L 12/741* (2013.01)
(Continued)

(52) U.S. Cl.
CPC .......... *G06F 9/45558* (2013.01); *H04L 45/74* (2013.01); *H04W 24/02* (2013.01); *H04W 28/16* (2013.01); *G06F 2009/45595* (2013.01)

(58) Field of Classification Search
CPC ................. G06F 9/45533–9/45558; G06F 2009/45562–2009/45595; H04L 45/74;
(Continued)

(56) References Cited

U.S. PATENT DOCUMENTS 7,937,438 B1    5/2011  Miller et al.
8,549,281 B2    10/2013 Samovskiy et al.
(Continued)

FOREIGN PATENT DOCUMENTS

EP    2316071 A1    5/2011
JP    2013187656 A  9/2013
WO    2012178055 A1 12/2012

OTHER PUBLICATIONS

Drutosky 2013, IEEE Computer Society "Scalable Network Virtualization in Software-Defined Networks". Retrieved on Jul. 16, 2014. pp. 8.
(Continued)

*Primary Examiner* — Timothy J Weidner
(74) *Attorney, Agent, or Firm* — Amin, Turocy & Watson, LLP

(57) ABSTRACT

A scalable virtualized network core is provided to allow for incrementally adjusting network resources in response to changing demand, and for improved flexibility in network management and control. The scalable virtualized network core provides a cloud evolved packet core that has virtual machines performing the functions of the individual server elements. As demand for network resources changes, additional virtual machines can be brought online or virtual machines can be terminated to efficiently address the demand. An abstraction agent can be provided to facilitate the physical to logical connections so that to the perspective of elements in a radio access network, no changes have been made. The abstraction agent also facilitates network control and management of the virtual machines.

20 Claims, 11 Drawing Sheets

(51) Int. Cl.
*H04W 24/02* (2009.01)
*H04W 28/16* (2009.01)

(58) Field of Classification Search
CPC ........ H04L 49/65; H04L 49/70; H04W 24/02; H04W 24/04; H04W 28/16; H04W 88/005
See application file for complete search history.

(56) References Cited

U.S. PATENT DOCUMENTS

| | | |
|---|---|---|
| 8,560,663 B2 | 10/2013 | Baucke et al. |
| 8,612,566 B2 | 12/2013 | Ferris et al. |
| 8,762,501 B2 | 6/2014 | Kempf et al. |
| 2011/0078303 A1 | 3/2011 | Li et al. |
| 2011/0188457 A1 | 8/2011 | Shu et al. |
| 2012/0266231 A1 | 10/2012 | Spiers et al. |
| 2012/0281706 A1 | 11/2012 | Agarwal et al. |
| 2012/0303835 A1* | 11/2012 | Kempf .................. H04W 24/02 709/235 |
| 2013/0036213 A1 | 2/2013 | Hasan et al. |
| 2013/0097296 A1 | 4/2013 | Gehrmann et al. |
| 2013/0121207 A1 | 5/2013 | Parker |
| 2013/0138814 A1 | 5/2013 | Kotecha |
| 2013/0304853 A1 | 11/2013 | Cooper et al. |
| 2013/0326516 A1 | 12/2013 | Hill |
| 2014/0050103 A1 | 2/2014 | Niu et al. |
| 2014/0075557 A1 | 3/2014 | Balabine et al. |
| 2014/0098815 A1 | 4/2014 | Mishra et al. |
| 2014/0113643 A1 | 4/2014 | Ma et al. |
| 2014/0153481 A1 | 6/2014 | Draznin et al. |
| 2014/0161447 A1 | 6/2014 | Graves et al. |
| 2014/0181267 A1 | 6/2014 | Wadkins et al. |
| 2014/0189692 A1 | 7/2014 | Wang et al. |
| 2015/0358248 A1* | 12/2015 | Saha ................... H04L 43/0817 709/226 |
| 2016/0080172 A1* | 3/2016 | Uberoy ............... H04L 12/4641 370/254 |

OTHER PUBLICATIONS

Greenberg 2009, "A Scalable and Flexible Data Center Netowrk". Retrieved on Jul. 16, 2014. pp. 12.

Kafetzkis 2012, International Conference on Telecommunications and Mutimedia "A QoE-driven Multidimensional Framework for Cloud Environments". Retrieved on Jul. 16, 2014. pp. 6.

Kim 2011, "Power-Aware Provisioning of Virtual Machines for Real-Time Cloud Services". Retrieved on Jul. 16, 2014. pp. 19.

Tso 2013, "Implementing Scalable, Network-Aware Virtual Machine Migration for Cloud Data Centers". Retrieved on Jul. 16, 2014. pp. 8.

* cited by examiner

SCALABLE NETWORK FUNCTION VIRTUALIZATION

TECHNICAL FIELD

The subject disclosure relates to scalable network function virtualization for a mobility core network.

BACKGROUND

Widespread proliferation of wireless broadband networks offers increased quality of experience for mobile users, but also renders management and maintenance of these networks a tedious and costly task. The network core, which facilitates mobile management and data transfer is traditionally comprised of individual server elements with each piece of hardware performing a dedicated task. The server elements may require frequent maintenance, and the network connectivity between the elements needs to remain highly reliable and fast. Network and/or element mis-configuration can lead to severe mobile user performance degradation. Also, if demand increases, additional hardware may need to be added to provide additional computing resources.

DETAILED DESCRIPTION

Figure 1:
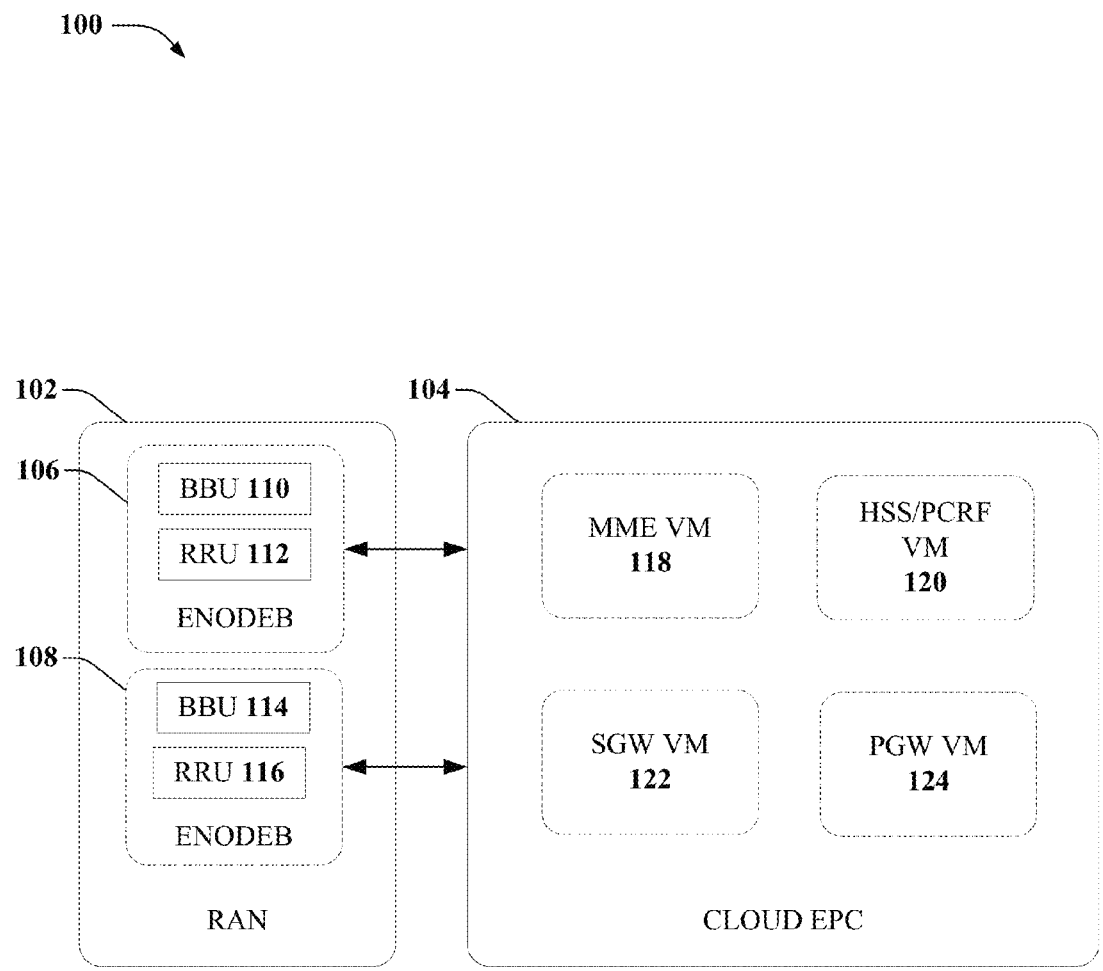
FIG. 1 is an example, non-limiting embodiment of a block diagram showing a network core system with virtualized core elements in accordance with various aspects described herein.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

A scalable virtualized network core is provided to allow for incrementally adjusting network resources in response to changing demand, and for improved flexibility in network management and control. The scalable virtualized network core provides a cloud evolved packet core ("EPC") that has virtual machines performing the functions of the individual server elements. As demand for network resources changes, additional virtual machines can be brought online or virtual machines can be terminated to efficiently address the demand. An abstraction agent can be provided to facilitate the physical to logical connections so that to the perspective of elements in a radio access network, no changes have been made. The abstraction agent also facilitates network control and management of the virtual machines.

In some embodiments, the virtual machines can individually perform the functions of all the server elements in an EPC. A virtual machine can thus be instantiated that performs all the functions of the EPC. In some embodiments, a single datacenter can host virtual machines that support a plurality of radio access networks, even radio access networks of different service providers.

For these considerations as well as other considerations, in one or more embodiments, a system includes a processor and a memory that stores executable instructions that when executed by the processor, facilitate performance of operations, including performing a control plane function and a data plane function for a mobile device via a virtualized evolved packet core network with virtual network elements respectively comprising a virtual machine performing functions related to respective virtual network elements. A first set of virtual network elements perform the control place function and a second set of virtual network elements different than the first set of virtual network elements perform the data plane function. The operations can also include instantiating a second virtual machine for a virtual network element of the virtual network elements in response to determining that a usage of a network resource of a first virtual machine of the virtual network element has satisfied a defined criterion.

In another embodiment, a method includes virtualizing, by a device comprising a processor, element data representing an abstract network element of a network device of an evolved packet core network by operating a first virtual machine that performs a function corresponding to the abstract network element. The method can also include instantiating, by the device, a second virtual machine associated with the abstract network element to perform the function corresponding to the abstract network element in response to determining that a usage of a network resource of the first virtual machine has satisfied a defined criterion.

In another embodiment, a system includes a processor and a memory that stores executable instructions that when executed by the processor, facilitate performance of operations, including performing functions corresponding to a network device of an mobile telecommunications core network with a first virtual machine, wherein the first virtual machine comprises virtual elements corresponding to elements of the evolved packet core network. The operations can also include determining that a usage of a network resource of the first virtual machine has satisfied a defined criterion. The operations can also include instantiating a second virtual machine that performs the functions corresponding to the network device of the mobile telecommunications core network and transferring traffic from the first virtual machine to the second virtual machine.

Turning now to FIG. 1, illustrated is an example, non-limiting embodiment of a block diagram 100 showing a network core system with virtualized core elements in accordance with various aspects described herein.

A mobile broadband network generally comprises a radio access network that facilitates communications between the mobile devices and a core network. In the case of Long Term Evolution ("LTE") networks and other 3rd Generation Partnership Project ("3GPP") compliant networks (e.g., LTE Advanced) and even non-3GPP systems such as WiMAX and CDMA2000, these networks are the radio access network (e.g., RAN 102 and an evolved packet core network (e.g., cloud EPC 104) that contains a series of components that provide mobile data and control management. In conventional EPC networks, these components are individual server elements, but in an embodiment of the subject application, these components of cloud EPC 104 are individual virtual machines running in cloud datacenters. It is to be appreciated that cloud EPC 104 is not limited to being an evolved packet core network. In other embodiments, other mobile telecommunications core networks and their elements can be virtualized.

The RAN 102 can include one or more Evolved Node Bs (e.g., eNodeBs 106 and 108) that are the hardware that is connected to the mobile phone network that communicates directly with mobile devices. The eNodeBs 106 and 108 can respectively include baseband units (e.g., BBUs 110 and 114) and remote radio unit (e.g., RRUs 112 and 116). The BBU units process baseband signals received and sent to the mobile devices and the RRU units are responsible for communications through the physical interface.

A Mobile Management Entity ("MME") virtual machine ("VM") 118 can be provided as a key control node for the mobile network that is responsible for idle mode mobile device paging and tagging procedure including retransmissions. It is involved in the bearer activation/deactivation process and is also responsible for choosing the Serving Gateway (e.g., SGW VM 122) for a mobile device at the initial attach and at time of intra-LTE handover involving Core Network (CN) node relocation. The MME VM 118 is also responsible for authenticating the user (by interacting with the Home Subscriber Server/Policy and Charging Rule Function "HSS/PCRF" VM 120). The HSS/PCRF VM 120 is a central database that contains user related and subscription material. Both the MME VM 118 and the HSS/PCRF VM 120 perform control plane function.

The SGW VM 122 is provided to route and forward data packets received from the mobile devices and PDN Gateway ("PGW") VM 124 is provided to facilitate connectivity between the mobile device and the external packet data networks. Each of the MME VM 118, HSS/PCRF VM 120, SGW VM 122, and PGW VM 124 perform the same or substantially similar functions that their specialized hardware server elements perform in conventional EPC core networks, except that in the subject application, the hardware server elements are replaced with virtual machines. These virtual machines run virtualized software functions running as cloud software processes and communicate using cloud-based software implementations of 3GPP interfaces. In an embodiment, the standard interfaces that the MME forms with the HSS (S6), SGW (S11), other MMEs (S10), and etc., can be replicated as software defined network interfaces in the cloud computing environments, thus the 3GPP standardization and protocols are maintained.

In an embodiment, portions of the RAN 102 can be virtualized as well, some or all parts of the BBUs 110 or 114 of the eNodeBs 106 or 108 can be relocated to the cloud, leaving only the RRUs 112 and 116 at the physical eNodeB location, which communicates with the cloud-based BBUs via fiber connection(s).

In an embodiment, the MME software is installed in MME VM 118 in a similar manner as it is typically installed in a remote server today. The MME VM 118 can then expose all the physical and logical interfaces to the MME software, which are then used for inter-VM communication with other VM-based EPC network element virtualizations (e.g., HSS/PCRF VM 120, SGW VM 122, and PGW VM 124). New instances of each virtual machine can be created on demand by a cloud hypervisor (or another type of cloud manager).

In an embodiment, the cloud hypervisor or manager can instantiate new specialized virtualized EPC elements with each element using a different virtual machine. The cloud manager is able to instantiate new VM elements based on observed network load. For example, if the cloud manager decides that a new MME needs to be activated in order to handle the increased signaling load in a particular highly populated area, then a new MME VM can be immediately instantiated in order to offload already active MME VM 118 that serves the particular area. Along similar lines, when the network load is subsequently reduced, the cloud manager may decide that not all MME VM instances are needed, and may thus terminate the new VM, in order to conserve cloud resources. To accomplish this, the system is able to rapidly and reliably: (a) activate new virtual elements and configure the parameters of the new instances, and (b) transfer state information among virtualized elements at instantiation and termination.

By way of example, if MME VM 118 is overloaded, the cloud manager can determine that a new MME VM should be instantiated. The new MME VM needs to be distinguished from other active virtual MMEs (e.g., MME VM 118) running in the datacenter (e.g. via its IP address) and establish new 3GPP-compliant interfaces with other, previously instantiated virtual EPC network elements (such as other MME VM 118, SGW VM 122, HSS/PCRF VM 120, and PGW VM 124, etc.), in a secure, efficient and timely manner. In the long term, this implies that a potentially large number of dynamically created 3GPP Sx interfaces (where Sx represents all EPC related interfaces) need to be active between VM elements in the cloud; additionally, care needs to be taken so that all these interfaces are efficiently maintained in order to remain fast and reliable.

In an embodiment, when new virtual machines are instantiated or terminated, state information needs to be transferred to or from the newly activated virtualized elements and the terminated virtualized elements. In an example where a new MME VM is activated, upon instantiation, the cloud manager/orchestrator rebalances the overall load and migrate some sessions to the new MME. Currently active session states from previously activated MME VM 118 is seamlessly passed on to this new virtual MME. Such state information may include Sx interface state (including S1-MME), security protocol state (e.g. IPsec/NDS parameters and security credentials), as well as list of NAS (Non Access Stratum) associations with mobile devices. This is performed in a seamless and reliable manner, in order to guarantee that the RAN 102 performance and thereby the UE performance remains unaffected to the extent possible.

In an embodiment, the MME VM 118, HSS/PCRF VM 120, SGW VM 122, and PGW VM 124 can be virtual processes running on servers in a datacenter. In other embodiments, the virtual machines can be spread across a plurality of datacenters. The cloud EPC 104 can provide core network functionality to a set of eNodeBs in a regional or a geographic area. It is to be appreciated that while FIG. 1 shows two eNodeBs, in other embodiments, a single eNodeB can be supported or more than two eNodeBs can be supported by cloud EPC 104. It is also to be appreciated that for the sake of simplicity, only four virtualized EPC elements are shown. In other embodiments, additional EPC elements from an EPC protocol stack can be virtualized (e.g., Evolved Packet Data Gateway, Access Network Discovery and Selection Function, and etc.)

Figure 2:
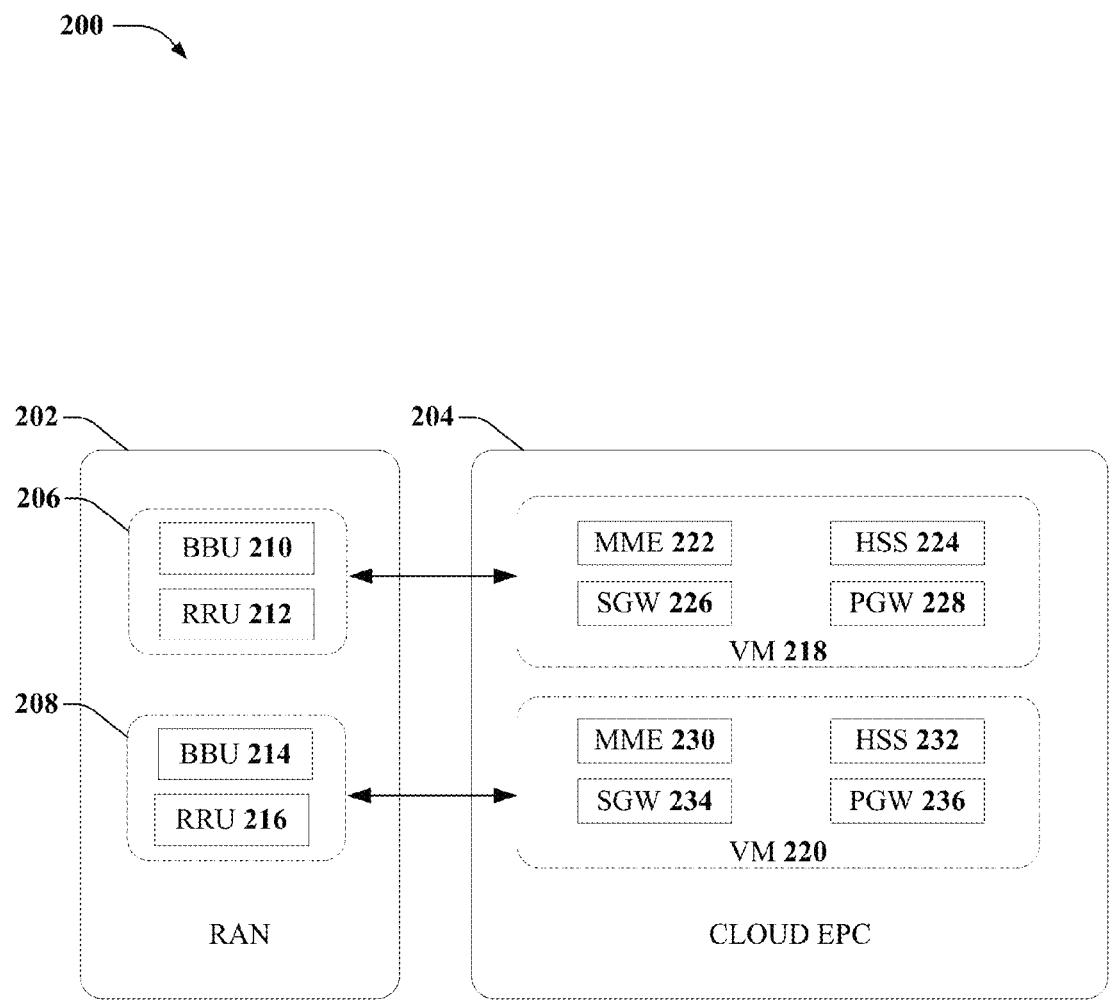
FIG. 2 is an example, non-limiting embodiment of a block diagram showing a network core system with virtualized cores in accordance with various aspects described herein.

Turning now to FIG. 2, illustrated is a block diagram 200 showing a network core system with virtualized cores in accordance with various aspects described herein. In the cloud EPC 204 in FIG. 2, the cloud EPC functions are virtualized like in FIG. 1 except that instead of running the EPC elements in individual virtual machines, all of the EPC elements are run collectively in a virtual machine. Thus, by way of example, in cloud EPC 204 two virtual machines, VM 218 and VM 220 each have the full complement of EPC elements (MME 222, HSS 224, SGW 226, PGW 228 for VM 218, and MME 230, HSS 232, SGW 234, and PGW 236 for VM 220).

As in FIG. 1, in FIG. 2 the RAN 202 can include one or more Evolved Node Bs (e.g., eNodeBs 206 and 208) or base station devices that are the hardware connected to the mobile phone network that communicates directly with mobile devices. The eNodeBs 206 and 208 can respectively include baseband units (e.g., BBUs 210 and 214) and remote radio unit (e.g., RRUs 212 and 216). The BBU units process baseband signals received and sent to the mobile devices and the RRU units are responsible for communications through the physical interface.

In an embodiment, new virtual machines can be instantiated with all of the necessary EPC elements MME, HSS, SGW, PGW, etc.) already installed and ready for operations. New virtual machines can be brought online to deal with additional demand or can be instantiated to allow for each EPC instance and network elements having a different configuration based on specific network policies. Additionally, having EPC instances in separate VMs makes the coexistence of EPCs belonging to different operators in the same datacenter more viable.

In an embodiment, VM 218 can process and manage communications for eNodeB 206 and VM 220 can process and manage communications for eNodeB 208. The MME 222, HSS 224, SGW 226, and PGW 228 on VM 218 can be configured for eNodeB 206 while MME 230, HSS 232, SGW 234, and PGW 236 on VM 220 can be configured for eNodeB 208. As either eNodeB 206 or 208 experience increased traffic, the corresponding VM (e.g., VM 218 or 220 respectively) can be cloned, mirrored, or otherwise copied to create a new VM to handle the increased traffic. Additionally, as more eNodeBs are connected, or brought online, one or more additional VMs can be instantiated. It is to be appreciated however that one or the other of VM 218 and VM 220 can process and manage communications for both eNodeB 206 and 208 in other embodiments.

Figure 3:
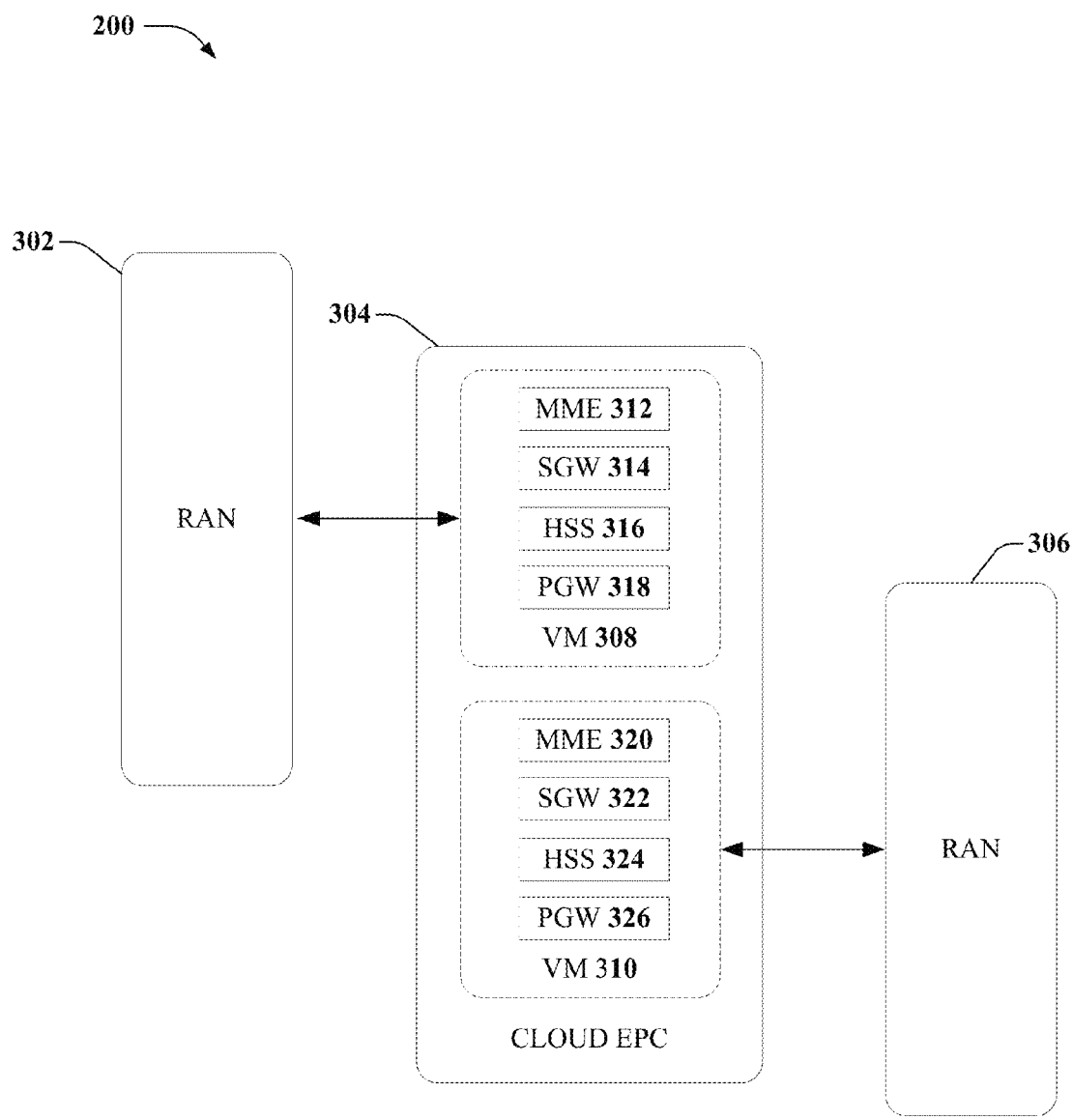
FIG. 3 is an example, non-limiting embodiment of a block diagram showing a network core system with virtualized cores supporting different radio networks in accordance with various aspects described herein.

Turning now to FIG. 3, illustrated is a block diagram 300 showing a network core system with virtualized cores supporting different radio networks in accordance with various aspects described herein. FIG. 3 shows an embodiment where a plurality of VMs with EPC instances in cloud EPC 304, (as in FIG. 2) serve different radio access networks. RAN 302 is served by VM 308 that has virtualized MME 312, SGW 314, HSS 316, and PGW 318 installed thereon. Likewise, RAN 306 is served by VM 310 that has MME 320, SGW 322, HSS 324, and PGW 326 installed or otherwise running thereon. Each of the VMs 308 and 310 can be running in the same cloud computing datacenter.

Figure 4:
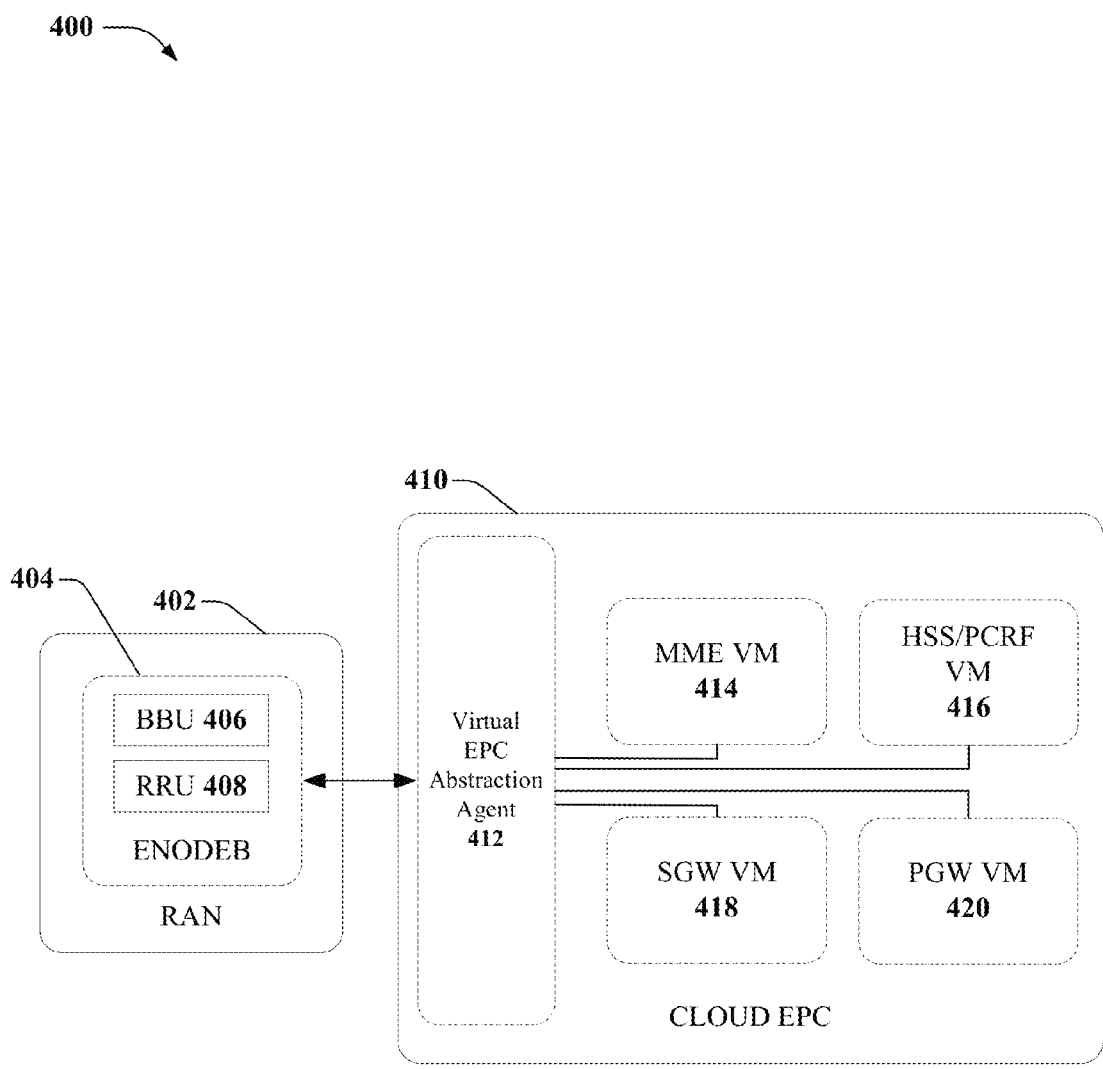
FIG. 4 is an example, non-limiting embodiment of a block diagram showing a network core system with a virtual EPC abstraction agent in accordance with various aspects described herein.

Turning now to FIG. 4, illustrated is a block diagram 400 showing a network core system with a virtual EPC abstraction agent in accordance with various aspects described herein. A RAN 402 that has an eNodeB 404 with BBU 406 and RRU 408 communicate with a cloud EPC 410 and the EPC element VMs (e.g., MME VM 414, HSS/PCRF VM 416, SGW VM 418 and PGW VM 420) via a Virtual EPC Abstraction Agent 412.

When changes to the virtual machines in cloud EPC 410 occur, for instance to adding or terminating a virtual machine, that change in configuration needs to be reflected in the configuration of elements in the RAN 404 due to changing IP addresses, assignments, etc. Conventionally however, the MME identity (e.g. the IP address) is pre-provisioned into the eNodeB 404 prior to activation. When eNodeB 404 is booted up, it uses the pre-provisioned identity of an MME in order to establish the S1-MME and S1-u interfaces with the MME VM 414 and SGW VM 418, respectively. However, when new MME VMs are instantiated on demand in the cloud, it can be a challenge to dynamically provision the new MME parameters into eNodeB 404 that is to be associated with the new MME, without compromising the attached user performance. Note that depending on the eNodeB 404 software implementation, this may require that the eNodeB 404 is powered off, re-programmed, and booted up again, each time the cloud manager decides that a new MME is to be instantiated. Accordingly, in the subject application, the abstraction agent 412 is provided to facilitate communications and between RAN 402 and cloud EPC 410.

As shown in FIG. 4, each of the virtual EPC elements MME VM 414, HSS/PCRF VM 416, SGW VM 418, and PGW VM 420 connects directly to the abstraction agent 412. The abstraction agent 412 provides a necessary abstraction for both the EPC side as well as the RAN side, as we discuss in detail below. The eNodeB 404 is also logically connected directly to the abstraction agent 412. It is to be appreciated that in FIG. 4 that there is no direct logical communication among the VMs; all VM traffic passes through the abstraction agent 412.

In an embodiment, the abstraction agent 412 is responsible for managing the cloud EPC 410 operations in a particular geographical area. For example, each LTE market (or sub-market, or a set of markets) can be managed by a single abstraction agent. With this, abstraction agent 412 would be responsible for serving a predetermined number of eNodeBs. By monitoring the signaling and traffic load that is generated by each eNodeB and its attached mobile devices, abstraction agent 412 can make adaptive decisions about whether the currently instantiated VMs are able to handle the traffic load, or whether one or more new virtual elements need to be activated.

Similarly, abstraction agent 412 can decides whether certain VMs do not need to remain active (e.g. due to decreased traffic load), and hence may decide to terminate the operation of one or more of VMs. Note that the abstraction agent 412 can be aware of (a) the maximum load that can be handled by each VM, and (b) the available resources in the cloud. Load monitoring and balancing takes place based on algorithms and management protocols that are provisioned into the abstraction agent 412. The load monitoring and balancing algorithms used by the abstraction agent 412 may be embedded into its software, or exposed to it by another software agent via a proprietary interface.

It is to be appreciated that in one or more embodiments of the subject application, not all of the network elements of the EPC will be virtualized. A network operator may decide that only some of the elements need to be virtualized. For example it is possible to virtualize only the MME, the SGW and the PGW, while using an HSS server that is not necessarily part of the cloud ecosystem. In that case, the MME VM 414, SGW VM 418, and PGW VM 420 can directly communicate with the abstraction agent 412. The abstraction agent 412 can then facilitate communications with the virtualized EPC elements and an HSS database. The HSS database can be located in the same datacenter that that cloud EPC 410 is located, or can be elsewhere, and connected to the cloud EPC via optical or otherwise high bandwidth network connections.

In an embodiment, the abstraction agent 412 can determine that not all of the active virtual elements are needed or that a specific element is to be taken offline for maintenance. For example, if abstraction agent 412 is currently managing two MME virtual elements, MME VM 414 and another MME VM, the load balancing algorithm may decide that the current NAS signaling load and active Sx interfaces in a particular area can be handled entirely by MME VM 414. This can be determined in cases when the load falls below a predetermined threshold associated with the capacity of the MME VM 414. In this case, the other MME VM is obsolete and it therefore can be terminated. Terminating obsolete virtual instances is beneficial in terms of: (a) conservation of cloud resources, and (b) reduction in management and monitoring load, since fewer virtual elements are now active.

In an embodiment, the abstraction agent 412 can terminate the obsolete VM through direct deactivation. If the obsolete element is active but idle (e.g. there are no mobile devices with active NAS sessions), or if it is a live mirror of another element, then abstraction agent 412 can terminate it directly by just powering it off, or permanently freezing or suspending it. As a further action, abstraction agent 412 can also delete it from the cloud, as long as there is sufficient software material to instantiate a similar element in the future as needed.

In another embodiment, the abstraction agent 412 can terminate the obsolete VM by transferring the state of the VM and then deactivating the VM. Transferring and deactivating can be done when the obsolete VM is responsible for only a very minor percentage of user (NAS, AS, or UP) traffic such that its load can be allocated exclusively to another active virtual element, then abstraction agent 412 can deactivate it after it has arranged so that its load is seamlessly transferred to another element.

In an embodiment, the abstraction agent 412 ensures that adaptive decisions for activating and/or terminating virtual elements do not degrade the performance of the other running virtual elements in the cloud and the overall LTE system performance, both from the RAN 402 and the cloud EPC 410 perspective. When activating a new EPC element, the rest of the virtual EPC ecosystem needs to become aware of the existence of the new element, via the creation of new Sx interfaces among the involved parties. For example, within the scope of cloud EPC 410, instantiating a new MME virtual machine requires the establishment of S6 interfaces with each HSS, S1 interfaces with each SGW, and S10 interfaces with other MME(s) and other interfaces. The abstraction agent 412 decides which MMEs will be connected with S10 interfaces, in the same way that the network operator today makes such deployment choices. Similarly, the abstraction agent 412 decides which SGWs and HSS are affiliated with MME and as a result, the abstraction agent 412 facilitates the establishment of the corresponding 3GPP (Sx) interfaces.

Figure 5:
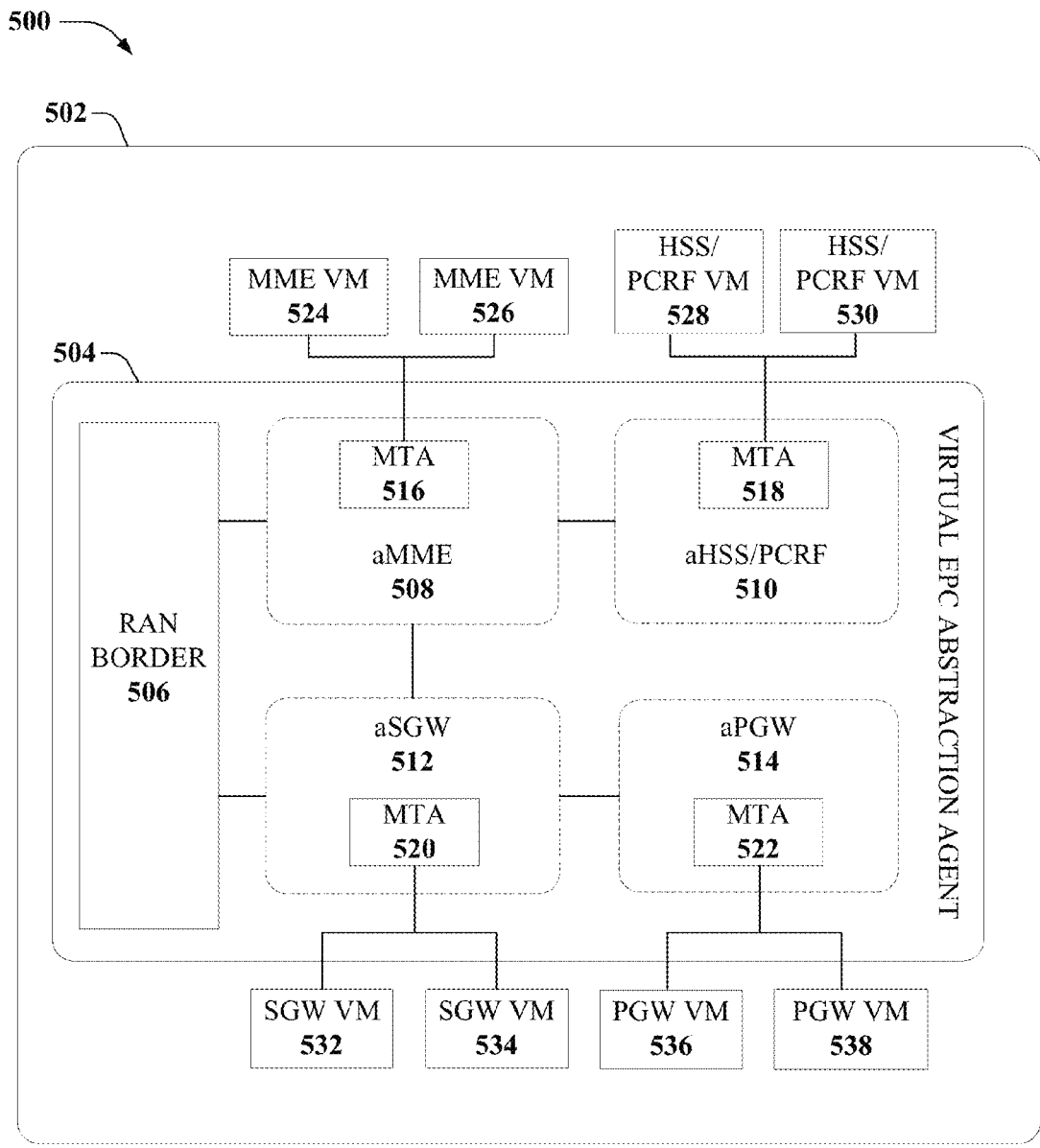
FIG. 5 is an example, non-limiting embodiment of a block diagram showing a virtual EPC abstraction agent in accordance with various aspects described herein.

Turning now to FIG. 5, illustrated is a block diagram 500 showing a virtual EPC abstraction agent 504 in a cloud EPC 502 in accordance with various aspects described herein. FIG. 5 shows the abstraction agent 412 of FIG. 4 in more detail and with a different representational view. While in FIG. 4, the abstraction agent is shown as an intermediate connection between the EPC elements and the RAN, in FIG. 5, the abstraction agent as shown as comprising one or more abstracted EPC elements (e.g., abstracted MME 508, abstracted HSS/PCRF 510, abstracted SGW 512, and abstracted PGW 514).

Each of the abstracted EPC elements communicate with each other and with virtual machines associated with each of the abstracted EPC elements via corresponding message translation agents (e.g, MTA 516, 518, 520, and 522) that translate and forward communications optically to the appropriate virtual elements.

In an embodiment, then abstraction agent 504 can provision a different IP address into each virtual element within the abstraction. In such a case, messages arriving at the aMME 508 virtual Sx interfaces will be translated by the abstraction agent 504 (via message header processing), and delivered to the correct virtual element within the scope of aMME. Similarly, outgoing Sx messages will be processed by the abstraction agent 504, such that they seem to appear as originating from aMME 508 towards the other virtual EPC elements. Other virtual EPC elements may also be delegated via its equivalent abstracted element.

In the absence of such APIs, the abstraction agent 504 can virtualize a local message translation agent (MTA) within the abstraction agent 504 scope, which will interface with the abstraction agent 504 core network functionality. More specifically, when a new message arrives at the aMME 508 border, the abstraction agent 504 core will forward it to the MTA 516. MTA 516 will perform local message translation and will further forward the message to its assigned MME virtual machine 524 or 526. In a similar manner, MTA 518 will forward messages to the appropriate HSS/PCRF VM 528 or 530, MTA 520 will forward messages to the appropriate SGW VM 532 or 534, and MTA 522 will forward messages to the appropriate PGW VM 536 or 538.

In an embodiment, the EPC abstraction that is constructed by the abstraction agent 504 is propagated towards the RAN side as well. In particular, abstraction agent 504 employs aMME 508 and aSGW 512 such that the internal decisions made in the cloud are not exposed to the RAN on the other side of RAN border 506. As a consequence, from the RAN perspective, there is a single MME entity (aMME 508), and a single SGW entity (aSGW 512) per cloud EPC 502. With this, aMME 508 is responsible for allocating S1-MME load to the corresponding MME virtual machines 524 and 5236 that it manages; similarly, aSGW 512 allocates S1-u load to the SGW virtual machines 532 and 534, based on local load balancing and routing decisions.

Figure 6:
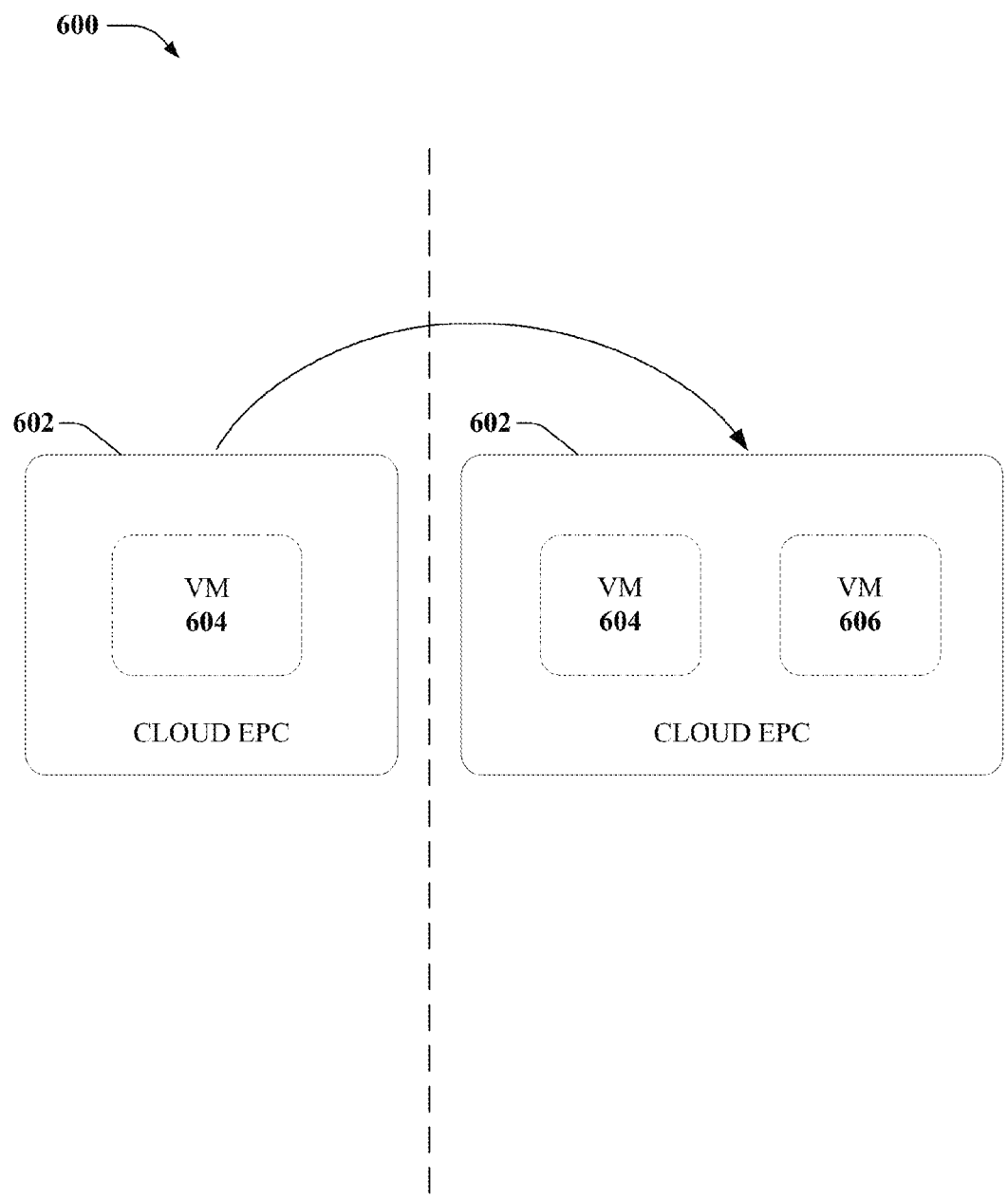
FIG. 6 is an example, non-limiting embodiment of a block diagram showing a system for cloning a virtual machine in accordance with various aspects described herein.

Turning now to FIG. 6, illustrated is a block diagram showing a system 600 for cloning a virtual machine in accordance with various aspects described herein. If a cloud manager or abstraction agent for cloud EPC 602 determines that the load on a VM 604 is above a predetermined threshold, or reaching the capacity of the VM 604, the cloud manager or abstraction agent can facilitate the cloning of the virtual machine 604.

When cloning the running VM 604, VM 604 is temporarily frozen (hibernated or suspended), it is then copied (cloned) into a new VM 606, and is then unfrozen. This requires a fast cloning process (order of a few hundreds of milliseconds) in the cloud. Upon completion of cloning, the two virtual machines VM 604 and VM 606 are instantly unfrozen/reactivating, and the cloud manager or abstraction agent decides which Sx interfaces and user signaling/traffic sessions to prune from each VM. As a result of live cloning and pruning, each of VM 604 and VM 606 ends up having to serve fewer eNodeBs and mobile devices and therefore has a reduced load.

It is to be appreciated that cloning a VM results in a VM copy with the exact same parameters as its donor VM. This includes specific virtual element parameters, such as the IP address. For example, the cloning of an MME VM will result in a new VM with the same MME identity and IP address.

Figure 7:
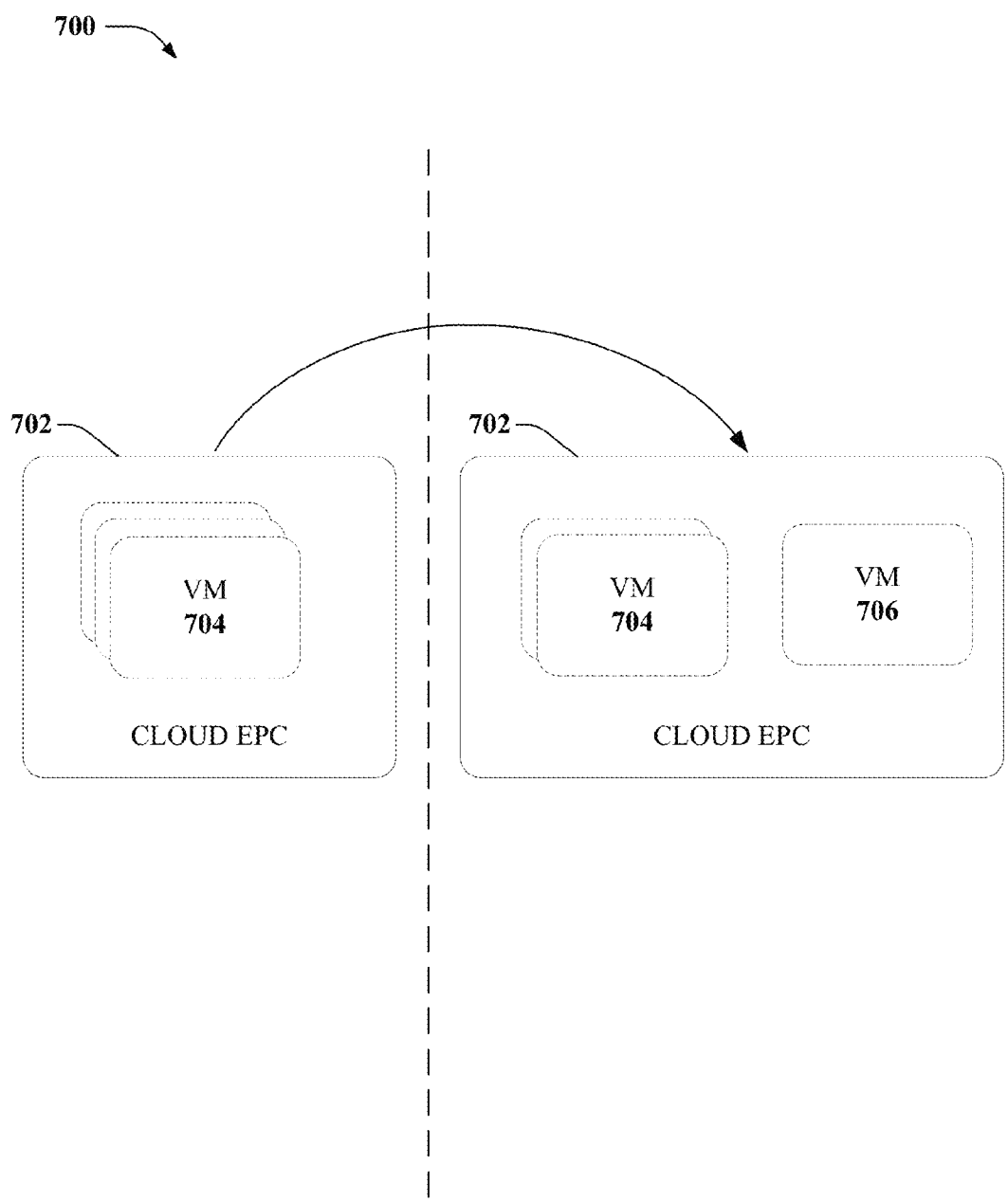
FIG. 7 is an example, non-limiting embodiment of a block diagram showing a system for instantiating a mirrored virtual machine in accordance with various aspects described herein.

Turning now to FIG. 7, a block diagram showing a system 700 for instantiating a mirrored virtual machine in accordance with various aspects described herein. If a cloud manager or abstraction agent for cloud EPC 702 determines that the load on a VM 704 is above a predetermined threshold, or reaching the capacity of the VM 704, the cloud manager or abstraction agent can facilitate instantiating or activating a live mirror of VM 704.

The abstraction agent or cloud manager maintains a dynamically chosen number of live mirrors for each VM (the number of minors can range from 1 up to a maximum value). Live minoring can take place simply by replicating the traffic from/to each VM, to its mirror(s). With this, all mirrored VMs maintain the exact same state information and interfaces. The advantage of this approach compared to live cloning is that the instantiation is much faster, since there is no time spent for freezing and copying. On the other hand, this method requires the availability of more cloud resources. Again here, when the abstraction agent detects that VM 704 is reaching its processing limit, one of the VM mirrors is converted to a new, independent virtual EPC element, VM 706. The abstraction agent or cloud manager can then prune a number of sessions and Sx interfaces from each of VM 704 and 706 to balance the load.

Figure 8:
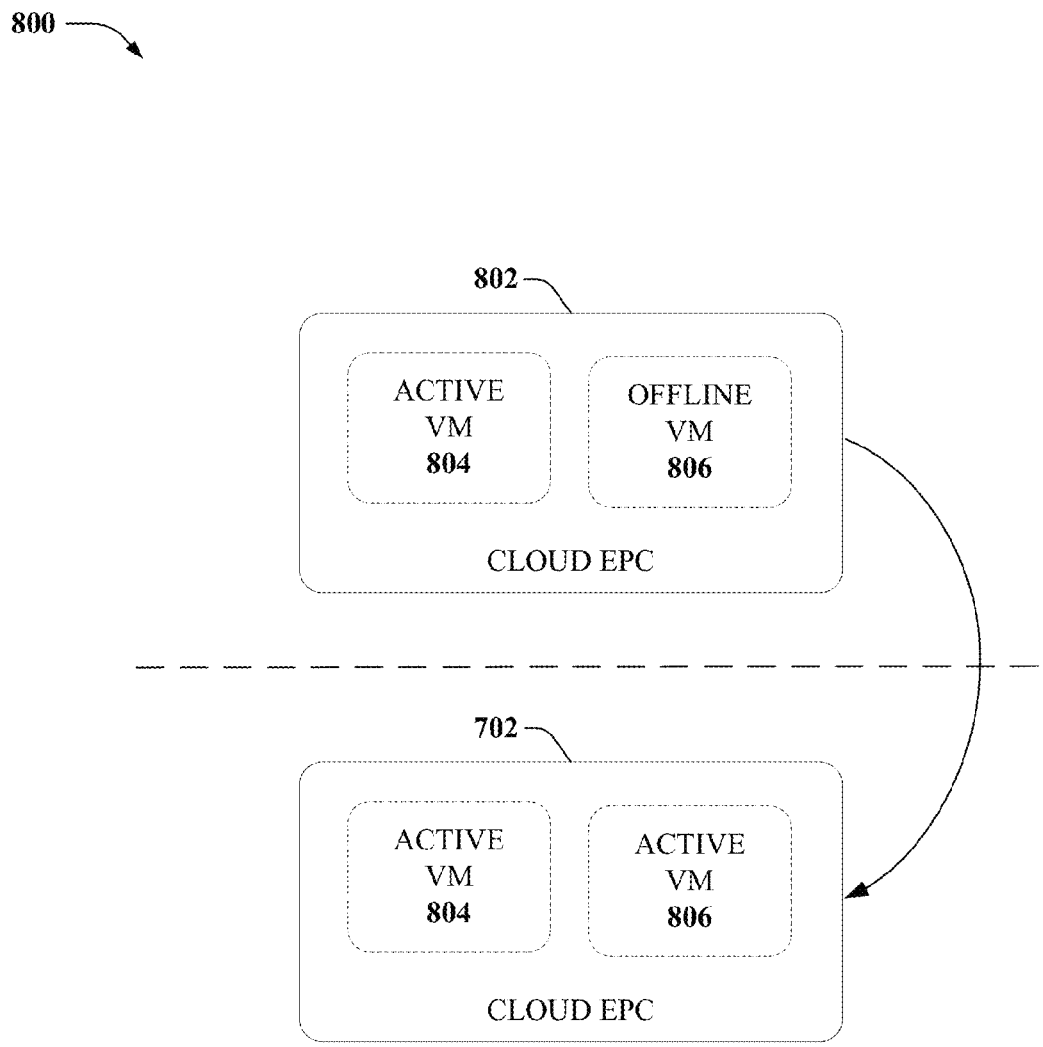
FIG. 8 is an example, non-limiting embodiment of a block diagram showing a system for instantiating an offline virtual machine in accordance with various aspects described herein.

Turning now to FIG. 8, illustrated is a block diagram showing a system 800 for instantiating an offline virtual machine in accordance with various aspects described herein. If a cloud manager or abstraction agent for cloud EPC 802 determines that the load on an active VM 804 is above a predetermined threshold, or reaching the capacity of the VM 804, the cloud manager or abstraction agent can facilitate instantiating or activating an offline VM 806.

The VM 806 residing in the pool of offline VMs may be either completely powered off, or frozen. When VM 806 from the pool is selected for going online, its state needs to be flushed, and updated with fresh information from currently active VM 804. In an embodiment, the VM implementation can expose the APIs that allow obtaining the state, and these APIs can be used for state provisioning into the newly activated VM. Upon provisioning of the state information, the abstraction agent or cloud manager performs pruning of certain Sx interfaces and UE traffic states, in the same way as with the other instantiation approaches. In another embodiment, the API may not allow exposing the full virtual elements in real time, so the cloud manager or abstraction agent can perform virtual proxy Sx signaling among the virtual elements.

Figure 9:
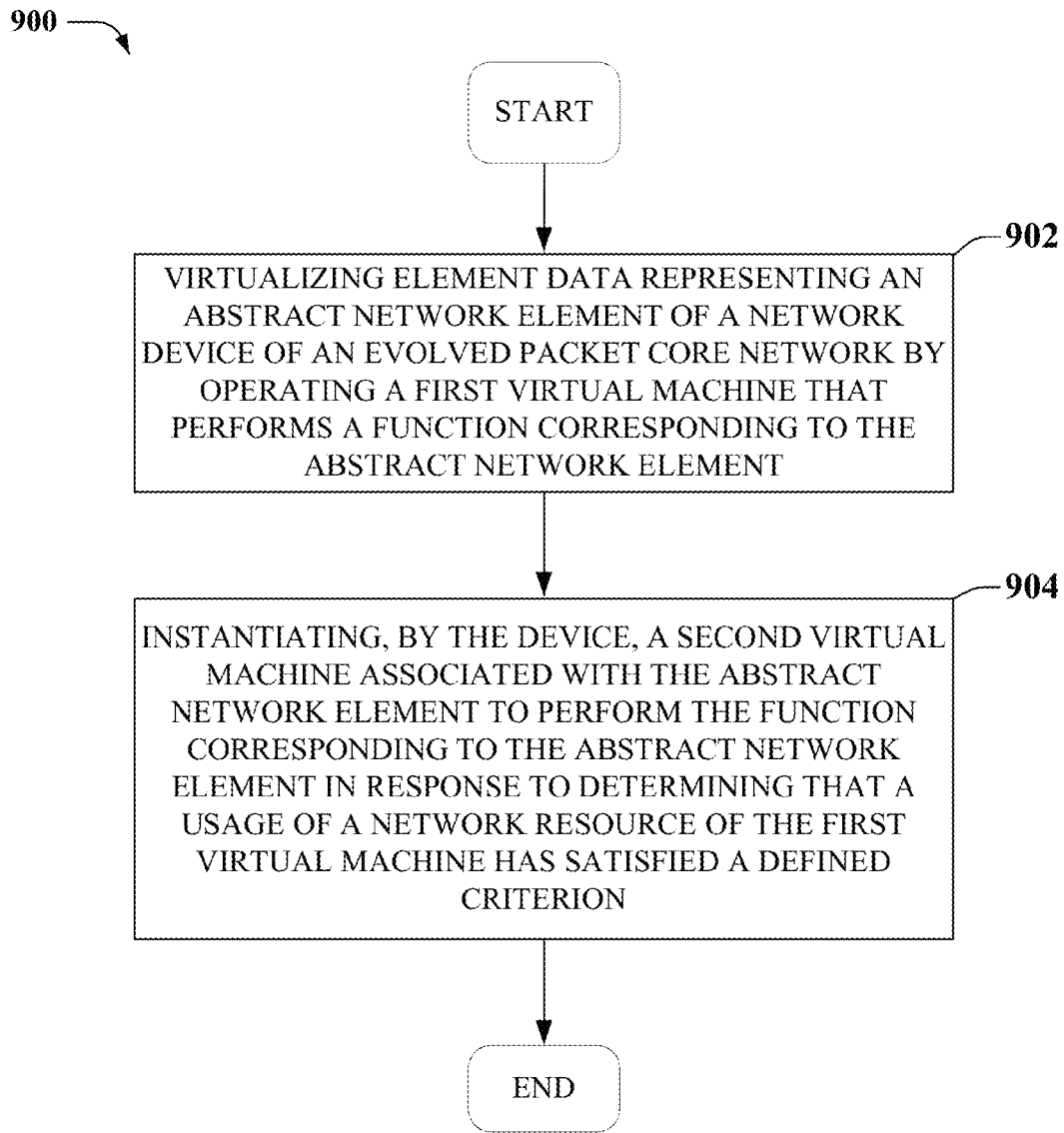
FIG. 9 illustrates a flow diagram of an example, non-limiting embodiment of a method for virtualizing a network core as described herein.

FIG. 9 illustrates a process in connection with the aforementioned systems. The process in FIG. 9 can be implemented for example by the systems in FIGS. 1-8. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 9 illustrates a flow diagram of an example, non-limiting embodiment of a method 900 for virtualizing a network core. At 902, the method comprises virtualizing an abstract network element of an evolved packet core network by operating a first virtual machine that performs a function corresponding to the abstract network element. At 904 the method includes instantiating, by the device, a second virtual machine associated with the abstract network element to perform the function corresponding to the abstract network element in response to determining that a usage of a network resource of the first virtual machine has satisfied a defined criterion.

Figure 10:
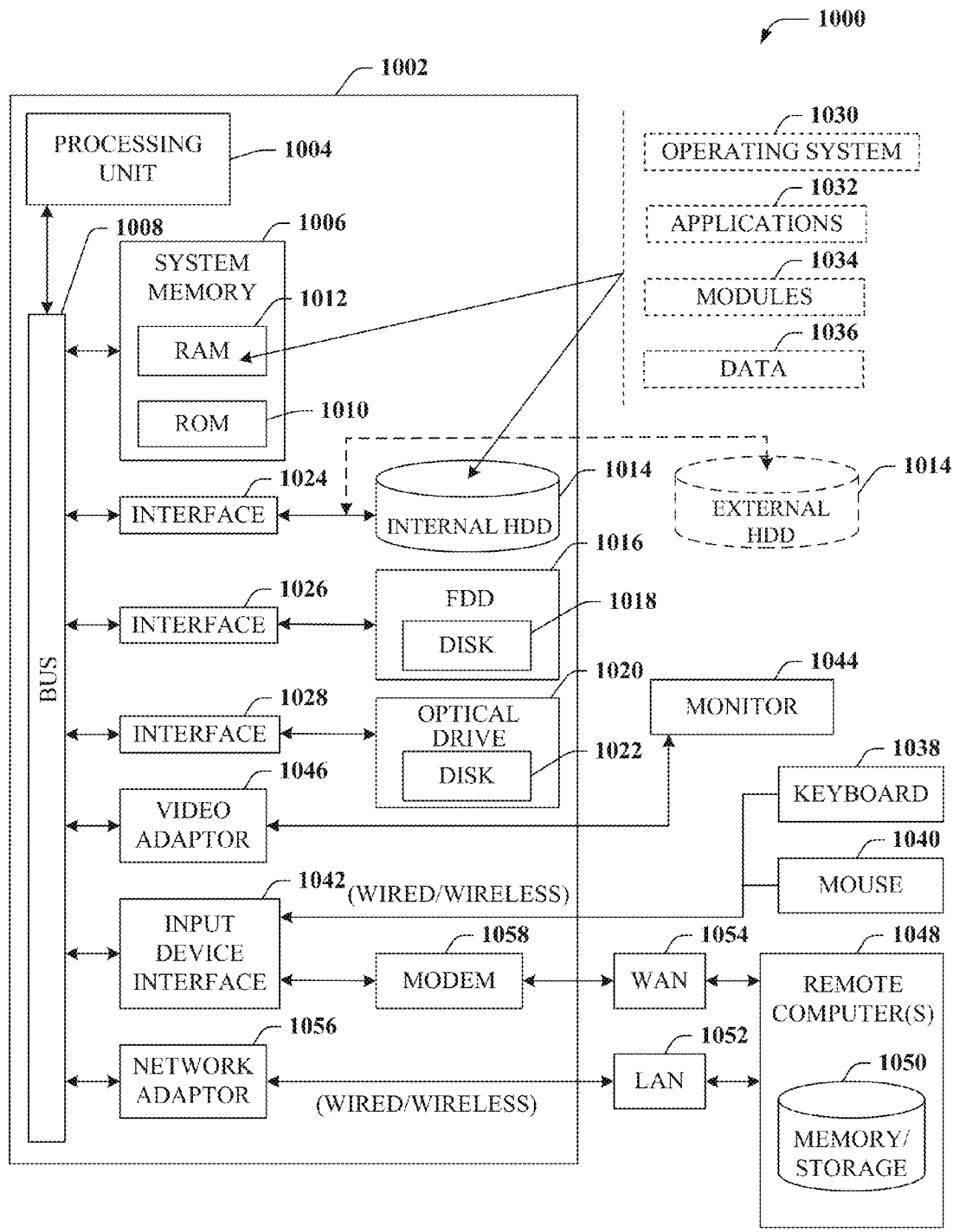
FIG. 10 is a block diagram of an example, non-limiting embodiment of a computing environment in accordance with various aspects described herein.

Referring now to FIG. 10, there is illustrated a block diagram of a computing environment in accordance with various aspects described herein. For example, in some embodiments, the computer can be or be included within the radio repeater system disclosed in any of the previous systems 200, 300, 400, 500, 600 and/or 700.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wireles sly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 BaseT wired Ethernet networks used in many offices.

In an embodiment of the subject application, the computer 1002 can provide the environment and/or setting in which one or more of the cloud EPCs disclosed in FIGS. 1-8 can be operated from. For instance, the virtual machines disclosed herein can be applications 1032 stored in hard drive 1014 and executed by processing unit 1004.

Figure 11:
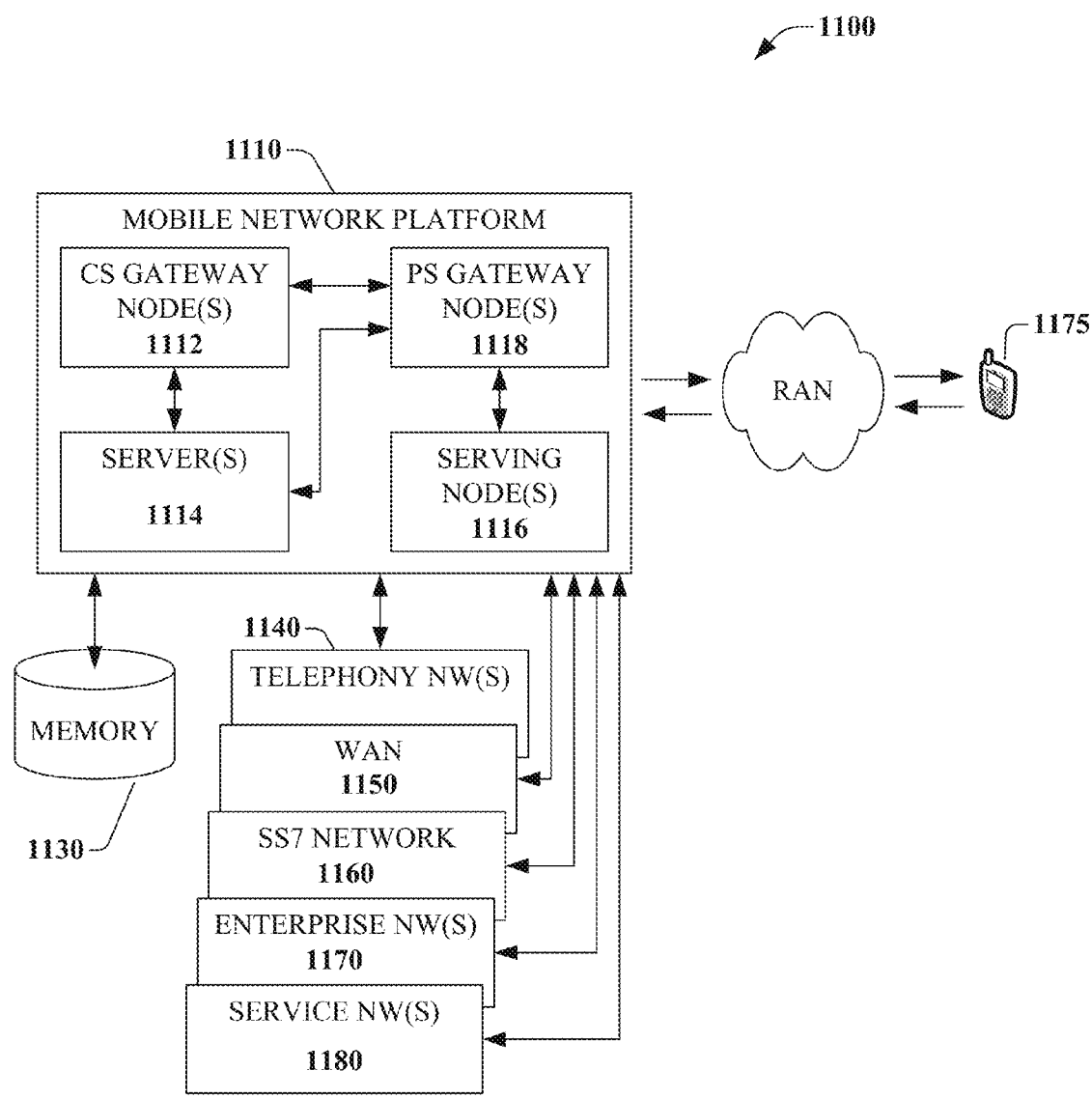
FIG. 11 is a block diagram of an example, non-limiting embodiment of a mobile network platform in accordance with various aspects described herein.

FIG. 11 presents an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1170; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication. Mobile network platform 1110 can also include the MMEs, HSS/PCRFs, SGWs, and PGWs disclosed herein.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1160 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1175.

It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1160, or SS7 network 1170. In an aspect, memory 1130 can be, for example, accessed as part of a data store component or as a remotely connected memory store.

In order to provide a context for the various aspects of the disclosed subject matter, FIGS. 10 and 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory (see below), non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of the each cell site of the acquired network. A classifier is a function that maps an input attribute vector, $x=(x1, x2, x3, x4, \ldots, xn)$, to a confidence that the input belongs to a class, that is, $f(x)=$confidence (class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which of the acquired cell sites will benefit a maximum number of subscribers and/or which of the acquired cell sites will add minimum value to the existing communication network coverage, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor; and
   a memory that stores executable instructions that, when executed by the processor, facilitate performance of operations, comprising:
   performing a control plane function and a data plane function for a mobile device via a virtualized evolved packet core network device with virtual network elements comprising a first virtual machine performing functions related to the virtual network elements, wherein a first group of virtual network elements of the virtual network elements perform the control plane function and a second group of virtual network elements of the virtual network elements, different than the first group of virtual network elements, perform the data plane function;
   instantiating a second virtual machine for a virtual network element of the virtual network elements in response to determining that a usage of a network resource of the first virtual machine has satisfied a first defined criterion; and
   routing, via message translation based on respective message headers, a first communication between a radio access network device and the first virtual machine, and a second communication between the radio access network device and the second virtual machine.

2. The system of claim 1, wherein the operations further comprise:
   disabling the second virtual machine for the virtual network element in response to determining that a combined usage of the network resource by the first virtual machine and the second virtual machine has decreased from a defined combined usage criterion.

3. The system of claim 1, wherein the operations further comprise:
   instantiating a message translation agent associated with the virtual network element; and
   routing, via the message translation agent, data that has been directed to the virtual network element to the first virtual machine or the second virtual machine.

4. The system of claim 1, wherein the operations further comprise:
   performing load balancing by shifting sessions from the first virtual machine to the second virtual machine in response to determining that a session load of the first virtual machine satisfies a second defined criterion.

5. The system of claim 1, wherein the routing comprises routing a message that has been received from the radio access network device to the first virtual machine or the second virtual machine via a base station device in the radio access network from which the message originated.

6. The system of claim 1, wherein the instantiating the second virtual machine further comprises:
   suspending the first virtual machine;
   cloning the first virtual machine to the second virtual machine;
   removing a first group of traffic sessions from the first virtual machine;
   removing a second group of traffic sessions different from the first group from the second virtual machine; and
   activating the first virtual machine and the second virtual machine.

7. The system of claim 1, wherein the instantiating the second virtual machine further comprises:
   converting a mirrored virtual machine of the first virtual machine to an active second virtual machine, removing a first group of traffic sessions from the first virtual machine, and removing a second group of traffic sessions different from the first group from the second virtual machine.

8. The system of claim 1, wherein the instantiating the second virtual machine further comprises:
   activating the second virtual machine, clearing a state of the second virtual machine, and updating the second virtual machine based on the first virtual machine.

9. A method, comprising:
   virtualizing, by a system comprising a processor, element data representing an abstract network element of a network device of an evolved packet core network by operating a first virtual machine that performs a function corresponding to the abstract network element;
   in response to determining that a use of a network resource of the first virtual machine has satisfied a first defined criterion, instantiating, by the system, a second virtual machine for facilitating a performance, by the second virtual machine, of the function corresponding to the abstract network element; and
   routing, via translation of a message header, a communication between a radio access network device and the first virtual machine or the second virtual machine.

10. The method of claim 9, further comprising:
    disabling, by the system, the second virtual machine in response to determining that a combined usage of the network resource by the first virtual machine and the second virtual machine has decreased below a defined level of usage of the network resource.

11. The method of claim 9, further comprising:
    instantiating, by the system, a message translation agent associated with the abstract network element, and routing, via the message translation agent, a message that has been directed to the abstract network element to the first virtual machine or the second virtual machine based on a message header of the message.

12. The method of claim 11, wherein the routing comprises:
    routing the message to the first virtual machine or the second virtual machine via a base station device of a radio access network, and wherein the message originated from the base station device.

13. The method of claim 9, further comprising:
    transferring, by the system, performance of operations between the first virtual machine and the second virtual machine in response to determining that a difference in network resource usage of the first virtual machine and the second virtual machine satisfies a second defined criterion.

14. The method of claim 9, wherein the instantiating the second virtual machine further comprises:
    replicating operations of the first virtual machine on the second virtual machine; and
    removing first traffic sessions from the first virtual machine and second traffic sessions from the second virtual machine.

15. The method of claim 9, wherein the instantiating the second virtual machine further comprises:
    activating the second virtual machine, removing first traffic sessions from the first virtual machine, and removing second traffic sessions from the second virtual machine.

16. The method of claim 9, wherein the instantiating the second virtual machine further comprises:
    activating the second virtual machine, clearing a state of the second virtual machine, and updating the second virtual machine based on the first virtual machine.

17. A non-transitory machine-readable storage medium, comprising executable instructions that, when executed by a processor of a mobile device, facilitate performance of operations, comprising:
    performing functions corresponding to a network device of a mobile telecommunications core network via a first virtual machine comprising virtual elements corresponding to respective elements of the mobile telecommunications core network;
    in response to determining that a usage, by the first virtual machine, of a network resource has satisfied a defined criterion, instantiating a second virtual machine to facilitate performance, by the second virtual machine, of the functions corresponding to the network device of the mobile telecommunications core network; and
    routing a communication between a radio access network device of a radio access network and the first virtual machine or the second virtual machine based on a translation of a header of a message.

18. The non-transitory machine-readable storage medium of claim 17, wherein the message has been received from a base station device of the radio access network, and wherein the routing comprises routing the communication to the first virtual machine or the second virtual machine.

19. The non-transitory machine-readable storage medium of claim 17, wherein the instantiating the second virtual machine further comprises:
    replicating operations of the first virtual machine on the second virtual machine; and
    removing a first traffic session from the first virtual machine and a second traffic session from the second virtual machine.

20. The non-transitory machine readable storage medium of claim 17, wherein the instantiating the second virtual machine further comprises:
    activating the second virtual machine, clearing a state of the second virtual machine, and updating the second virtual machine based on a determined state of the first virtual machine.

* * * * *